United States Patent

Scharf et al.

[11] Patent Number: 6,074,159
[45] Date of Patent: Jun. 13, 2000

[54] TRUCK BOX DIVIDER

[76] Inventors: James E. Scharf; Andrew Wilkinson, both of P.O. Box 221, Perdue Saskatchewan, Canada, S0K 3C0

[21] Appl. No.: 09/111,385

[22] Filed: Jul. 7, 1998

[30] Foreign Application Priority Data

Jul. 7, 1997 [CA] Canada ................................. 2209971

[51] Int. Cl.⁷ ..................................................... B60P 1/00
[52] U.S. Cl. ............................... 414/467; 414/520; 298/7
[58] Field of Search ...................................... 414/467, 519, 414/520, 539; 298/7; 296/15, 184

[56] References Cited

U.S. PATENT DOCUMENTS

| | | | |
|---|---|---|---|
| 2,325,492 | 7/1943 | Erickson | 414/520 |
| 2,675,947 | 4/1954 | Wynn, Sr. | 298/7 |
| 2,764,450 | 9/1956 | Rosener | 298/7 |
| 4,666,211 | 5/1987 | Smith et al. | 296/184 |

Primary Examiner—Dean J. Kramer
Attorney, Agent, or Firm—Murray E. Thrift; Adrian D. Battison; Michael R. Williams

[57] ABSTRACT

A truck box divider is installed in a truck box to divide the box into a front chamber and a rear chamber for carrying different materials, for example seed and fertilizer. The divider includes a V-shaped divider mounted midway along the box with the apex directed towards the back end of the box. A tunnel tapering in height leads from the back end of the V shaped box separator to a gate at the back of the truck box. Two additional side gates are positioned on opposite sides of the tunnel gate.

11 Claims, 5 Drawing Sheets

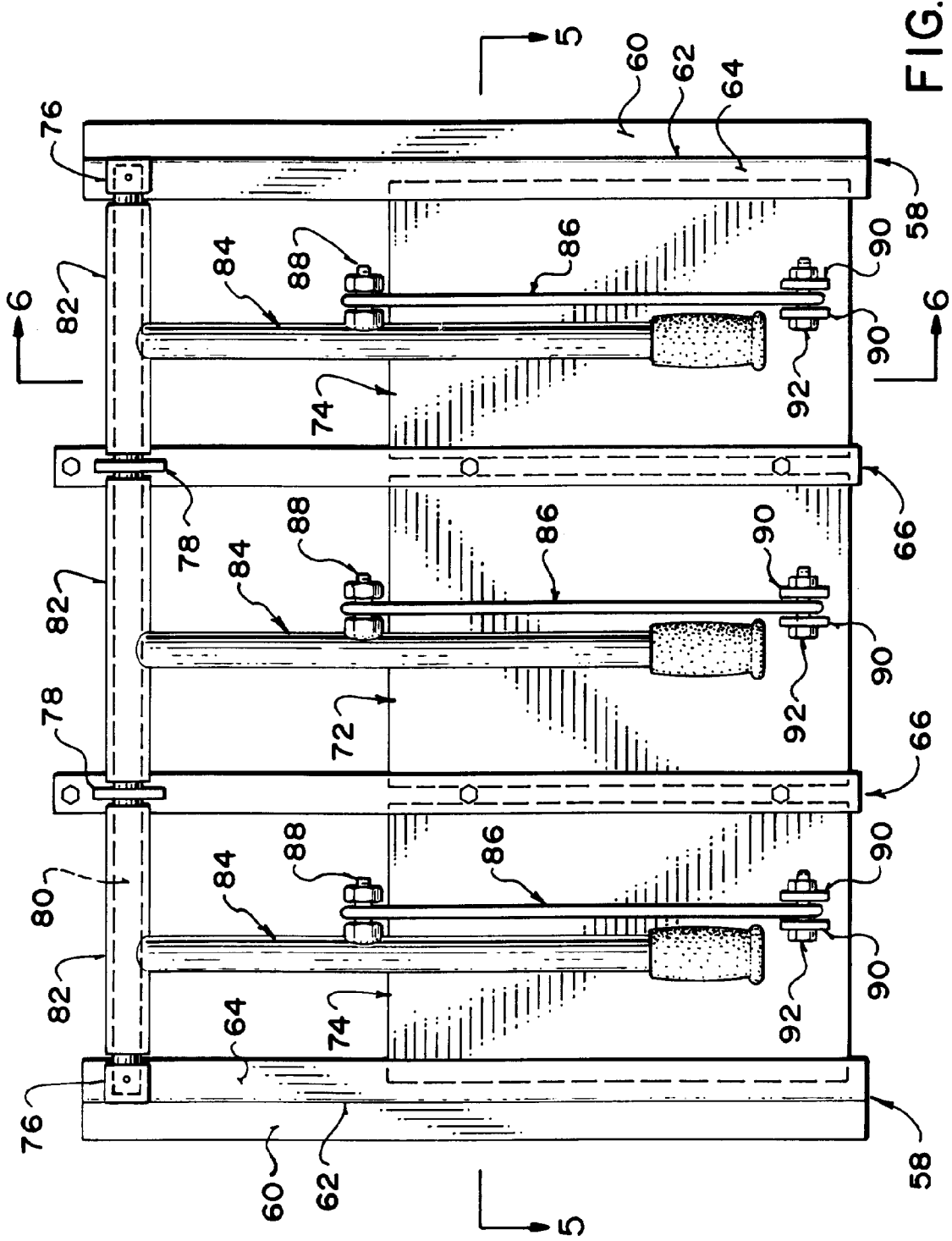

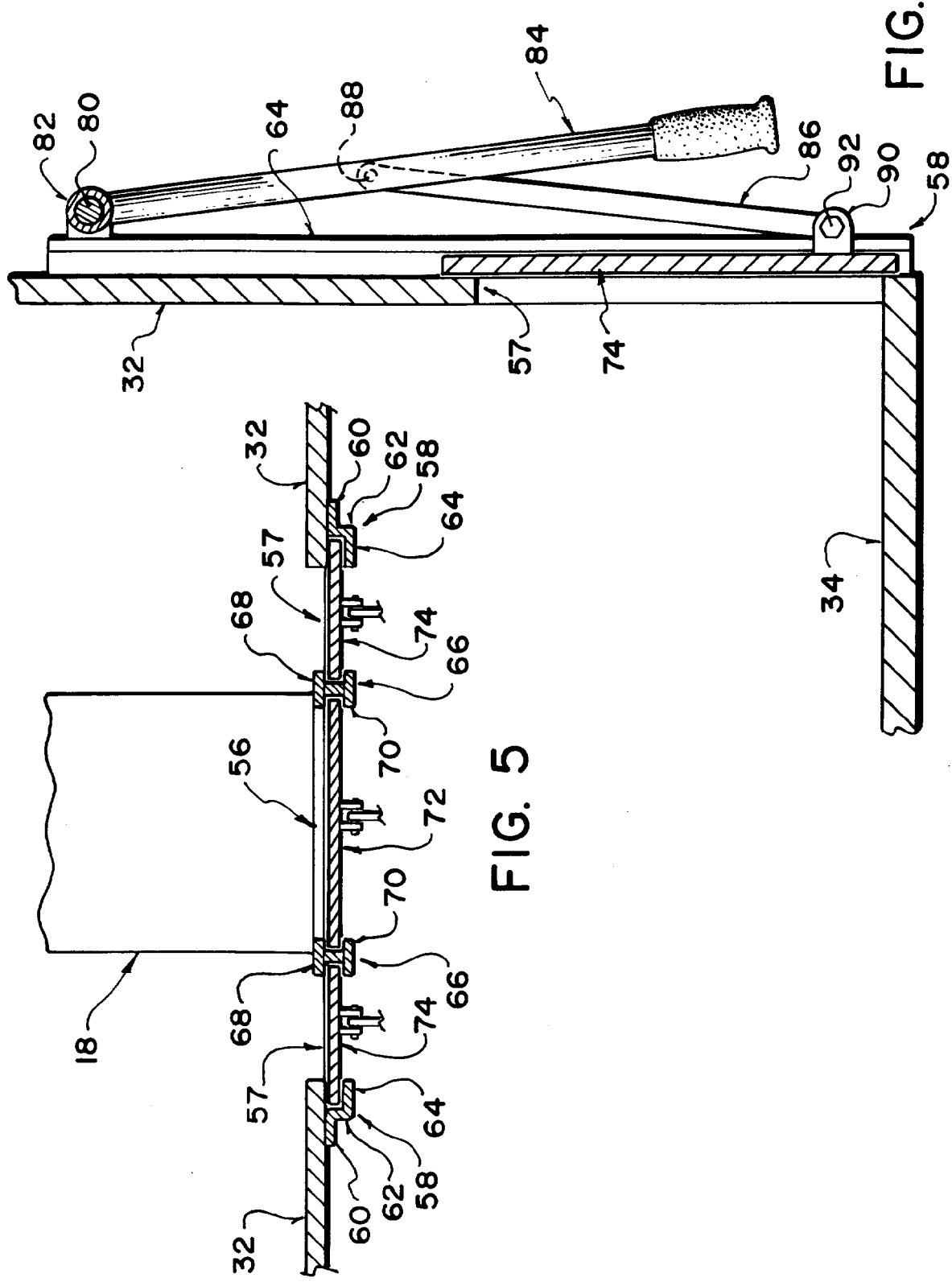

TRUCK BOX DIVIDER

FIELD OF THE INVENTION

The present invention relates to box dividers for trucks, particularly agricultural trucks.

BACKGROUND

In modern agricultural practice, it is common to seed and fertilize at the same time, for example using an air seeder. This requires the farmer to fill two tanks in the seeder, one with seed and the other with fertilizer. This in turn may require two trucks to carry the two materials to the field or two trips with one truck. Some box dividers have been proposed to alleviate this problem, so that both materials can be carried in the truck. These generally require the use of unloading augers or a specially constructed truck box with a built in unloading auger mechanism.

The present invention is concerned with an alternative solution to this, problem.

SUMMARY

According to one aspect of the invention there is provided a box divider for a truck box, said divider comprising:

separator means adapted to extend across the box to divide the box into front and back compartments and having an opening therethrough; and an elongate hollow tunnel having an open front end connected to the separator means in communication with the opening and an open back end that is spaced from the front end.

The divider, when installed in the truck box, forms a front chamber and a rear chamber in the box. The latter is partially divided by the tunnel, but the tapering tunnel ensures in the main that there is good cross flow in the back chamber. The tunnel leads to a discharge gate at the back of the truck box, so that the front chamber can be emptied by tipping the box.

The divider is preferably V shaped so that when the box is tipped, the material in the front chamber will be funneled down into the tunnel. A gate controlled opening is used to allow flow from the tunnel. Two side gates are located on opposite sides of the centre gate to provide for full discharge from the back chamber.

According to another aspect of the present invention there is provided, in an agricultural truck box having a front wall, a back wall and two spaced side walls, a box divider comprising:

divider means extending across the box and dividing the box into front and back compartments;

an elongate hollow tunnel extending from the divider means to the back wall for delivering particulate material from the front compartment to the back wall; and gate means in the back wall for selectively releasing a flow of material from the front compartment of the box, through the tunnel, and for selectively releasing a flow of material from the back compartment of the box.

In preferred embodiments, the gate means comprise a gate in the back wall of the box and gate divider means dividing the gate into plural gate sections including at least one gate section communicating with the end of the tunnel and at least one gate section communicating with the back compartment of the truck box. The back compartment preferably discharges through two gate sections on opposite sides of the tunnel.

BRIEF DESCRIPTION OF THE DRAWINGS

In the accompanying drawings, which illustrate an exemplary embodiment of the present invention:

FIG. 4 is a partial rear view of a truck box, showing multiple gates;

FIG. 5 is a cross section along the line 5—5 of FIG. 4; and

FIG. 6 is a cross section along the line 6—6 of FIG. 4.

DETAILED DESCRIPTION

Figure 1:
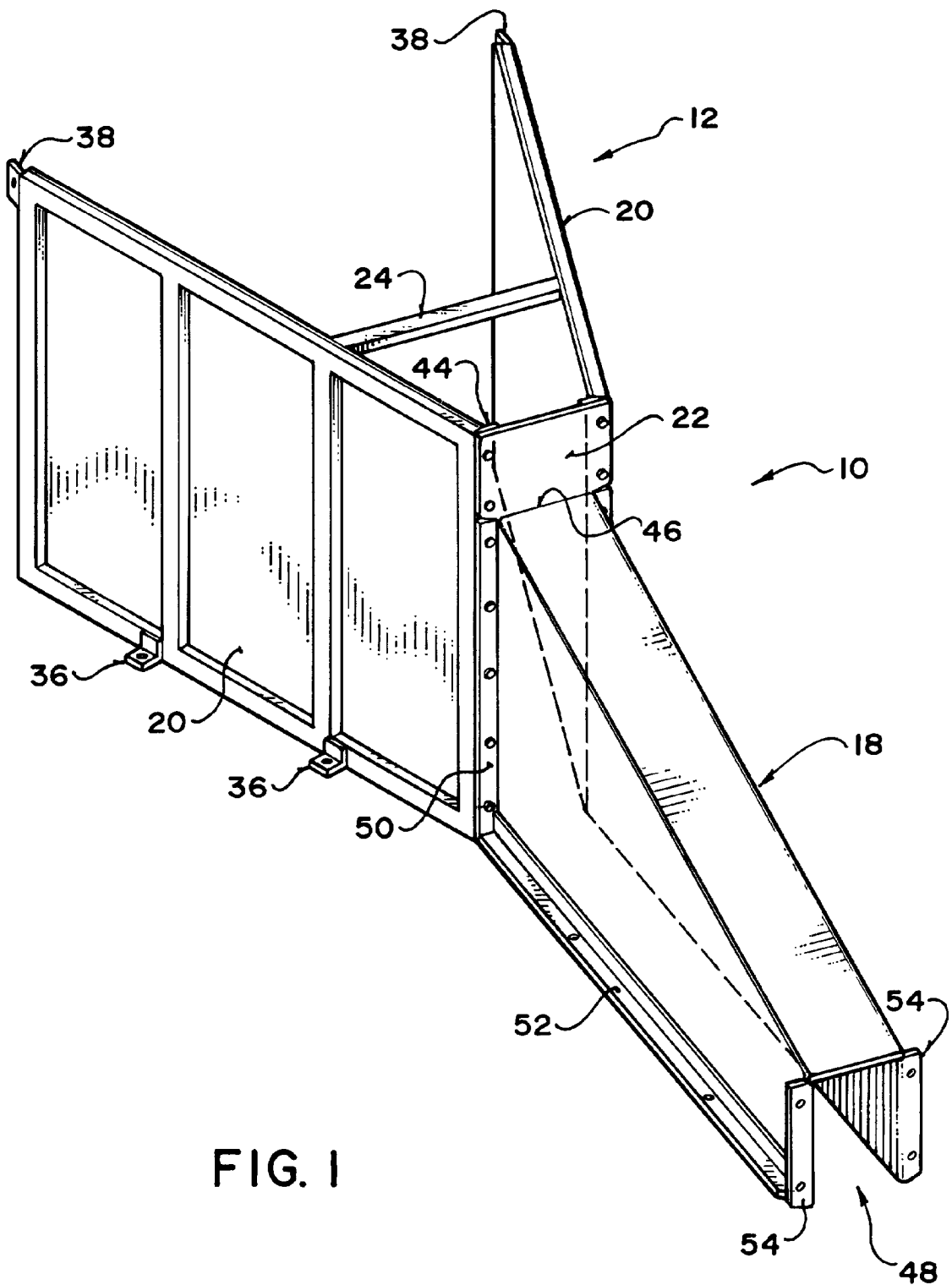
FIG. 1 is an isometric view of a box divider according to the present invention.

Referring to the accompanying drawings, especially to FIG. 1, there is illustrated a truck box divider 10 that includes a V-shaped separator 12 for separating a truck box into a front chamber 14 and a back chamber 16. Extending from the apex of the V-shaped separator to the back of the divider is a tunnel 18.

The separator component 12 includes two rectangular side panels 20 that diverge forwardly. A rear panel 22 extends across the apex of the two side panels, above the front end of the tunnel 18. A cross brace 24 spaced from the apex stiffens the structure against bending at the apex.

Figure 2:
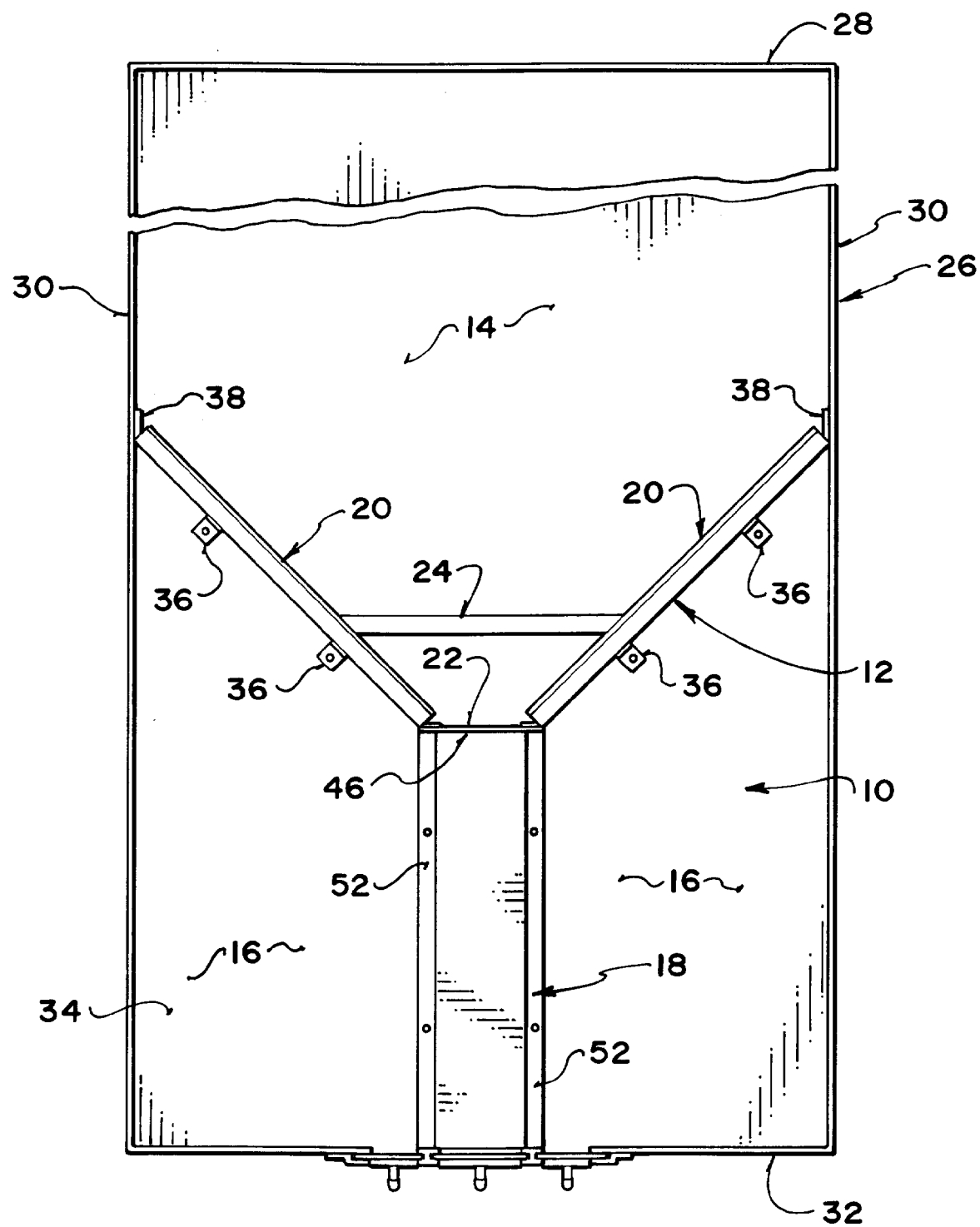
FIG. 2 is a plan view of the box divider installed in the truck box.
Figure 3:
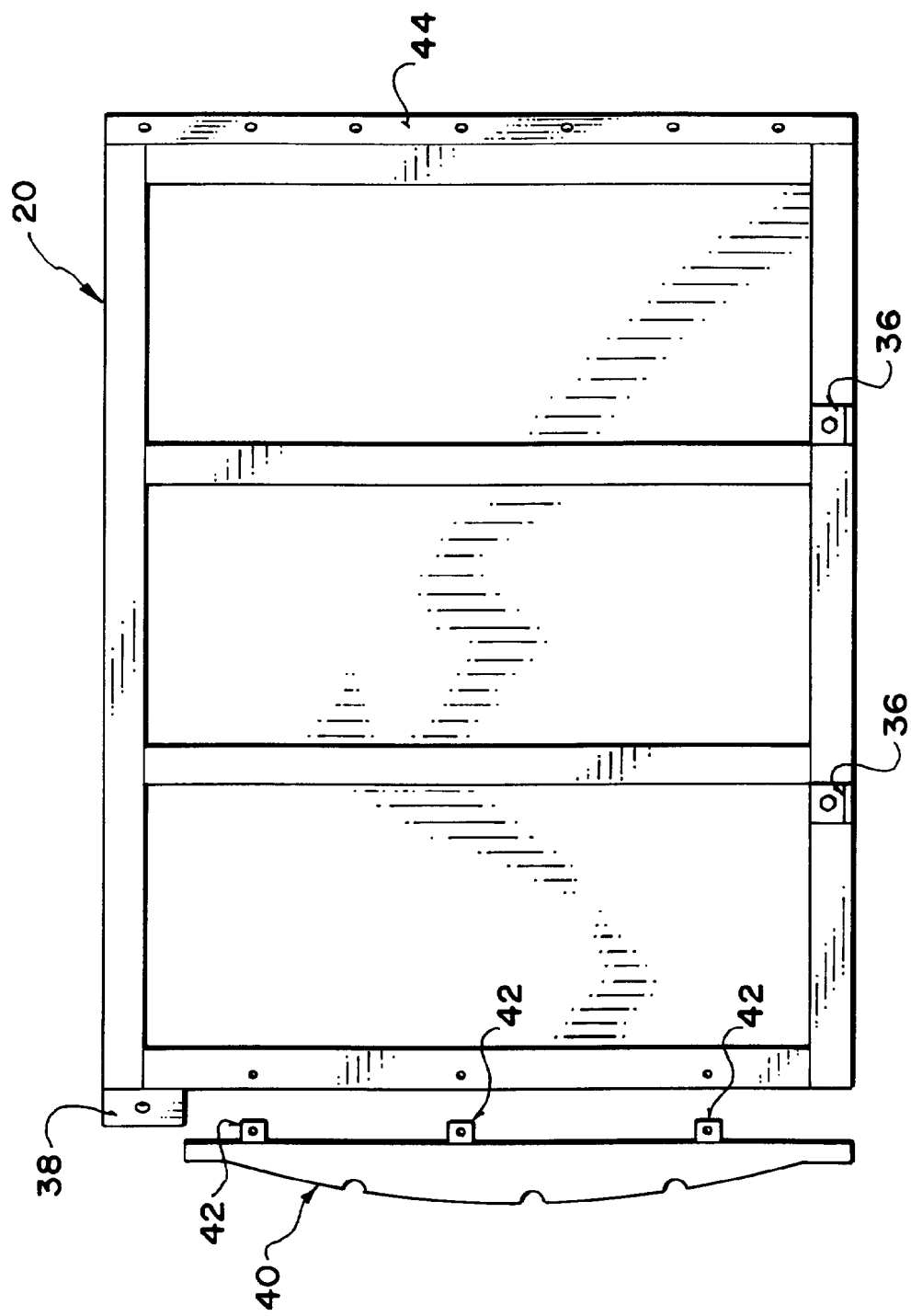
FIG. 3 is a side view of one side panel of the divider.

The divider is mounted in a truck box 26 as illustrated in FIG. 2. The box has a front wall 28, two side walls 30 and a back wall or tail gate 32 The box also has a flat floor 34.

The divider is installed with the separator 12 extending across the box about midway therealong and the tunnel 18 extending from the apex of the separator to the back wall 32 of the truck box. Each of the side panels 20 is fastened to the floor of the truck box using two base brackets 36. At its front end, each of the side panels 20 is connected to a respective side wall 30 of the truck box by a front bracket 38 at the top corner of the side panel.

Extending along the front edge of each side panel 20 is a front edge seal 40 that is contoured to match the internal contour of the truck box to ensure a good seal between the separator and the side walls 30 of the box. The seal is fastened to the panel 20 using a series of tabs 42 projecting from the back end of the seal and bolted to the side panel.

At the back end of each side panel 20 is a flange 44 extending along the back edge for connection to the back panel 22 and to the tunnel 18.

The tunnel 18 has a rectangular cross section. It has a front end 46 that is much greater in height than the back end 48. At the front end of the tunnel is a coupling flange 50 that is connected to the back flanges 44 on the side panels 20. Mounting angles 52 extend along the bottom edges of the tunnel for connecting the tunnel to the floor of the truck box. At the back end of the tunnel, on its opposite sides, are coupling flanges 54 that connect the back end of the tunnel to the back wall 32 of the truck box.

As illustrated most particularly in FIGS. 4, 5 and 6, the back wall 32 of the truck box has a centre gate opening 56 aligned with the back end of the tunnel and two side gate openings 57 on opposite lateral sides of the gate opening.

On the outer sides of the side openings 57 are respective side rails 58. Each of these includes a flange 60 mounted on the back of the box back wall 32. An offset section 62 along the inner edge of the flange 60 carries a flange 64 generally parallel to the back wall of the truck box to provide a slot between the two.

Between the centre gate opening 56 and the side gate openings 57 are respective inner rails 66. Each of these includes inner and outer flanges 68 and 70 providing two slots which face inwardly and outwardly respectively. A centre gate panel 72 slides in the two inwardly facing slots provided by the inner rails 66. The panel closes the centre opening 56 in a closed position of the panel, at the bottom of its travel. Two side gate panels 74 likewise close the side gate openings 57 and slide in the pairs of slots provided by the side and inner rails 58 and 66.

Above the gate openings 56 and 57, the side rails 58 carry brackets 76. Two brackets 78 are mounted on the inner rails 66. These brackets 76 and 78 are aligned and carry a cross shaft 80. Each section of the cross shaft, between a respective pair of the rails, carries a tube 82 that rotates on the shaft. A handle 84 is fixed to each tube 82 to project from it. A link 86 is connected to the handle by a pivot 88 and to a pair of lugs 90 on a respective gate by a pivot 92. The handles, when rotated upwardly, raise the gates to open the respective gate openings.

In use, one material is placed in the front chamber of the box, while a second material is placed in the back chamber. To unload the material from the front chamber, the centre gate panel 72 is raised and the truck box is raised to a dumping position to unload the desired quantity of material. This will be dumped into a hopper for an auger or any other suitable receptacle.

To deliver the materials from the back chamber of the truck box, one or both of the side gate panels is open and the truck box is raised to dump material from the open gate. Because of the tapered configuration of the tunnel, the material in the back chamber is a single body of material for most of the dumping process. Both side gates will be opened to complete the cleanout. Any known corner or cleanout can be used for emptying the back corners of the truck box.

While one embodiment of the present invention has been described in the foregoing, it is to be understood that other embodiments are possible within the scope of the invention and are intended to be included herein. The invention is to be considered limited solely by the scope of the appended claims.

What is claimed is:

1. A box divider for a truck box, said divider comprising:
   separator means adapted to extend across the box to divide the box into front and back compartments and having an opening therethrough; and
   an elongate hollow tunnel having an open front end secured directly to a back side of the separator means in communication with the opening and an open back end that is spaced from the front end.

2. A divider according to claim 1 wherein the back end of the tunnel is substantially smaller in cross sectional area than the front end.

3. A divider according to claim 1 wherein the separator means comprise two panels diverging forwardly from the front end of the tunnel.

4. A divider according to claim 1 wherein the tunnel has a diminishing height from the front end to the back end.

5. A box divider for a truck box, said divider comprising:
   separator means adapted to extend across the box to divide the box into front and back compartments and having an opening therethrough; and
   an elongate hollow tunnel having an open front end connected to the separator means in communication with the opening and an open back end that is spaced from the front end, the tunnel having a diminishing height from the front end to the back end and a substantially uniform width from the front end to the back end.

6. In an agricultural truck box having a front wall, a back wall and two spaced side walls, a box divider comprising:
   divider means extending across the box and dividing the box into front and back compartments;
   an elongate hollow tunnel extending from the divider means to the back wall for delivering particulate material from the front compartment to the back wall; and
   gate means in the back wall for selectively releasing a flow of material from the front compartment of the box, through the tunnel, and for selectively releasing a flow of material from the back compartment of the box.

7. A truck box according to claim 6 wherein the gate means comprise a gate in the back wall of the box and gate divider means dividing the gate into plural gate sections including at least one gate section communicating with the end of the tunnel and at least one gate section communicating with the back compartment of the truck box.

8. A truck box according to claim 6 wherein the tunnel tapers in height from the front end to the back end.

9. A truck box according to claim 6 wherein the gate means comprise a centre opening in the back wall of the truck box communicating with the back end of the tunnel, two side openings in the back wall communicating with the back compartment on opposite sides of the tunnel, a centre gate selectively closing the centre opening and two side gates selectively closing the side openings.

10. A truck box according to claim 9 wherein the side openings are positioned adjacent and opposite sides of the centre opening.

11. A truck box according to claim 6 wherein the separator means comprises substantially V-shaped wall connected to the front end of the tunnel at the apex of the wall.

* * * * *